US006769060B1

(12) United States Patent
Dent et al.

(10) Patent No.: US 6,769,060 B1
(45) Date of Patent: Jul. 27, 2004

(54) METHOD OF BILATERAL IDENTITY AUTHENTICATION

(75) Inventors: Paul W. Dent, Pittsboro, NC (US); Nils Rydbeck, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 861 days.

(21) Appl. No.: 09/695,964

(22) Filed: Oct. 25, 2000

(51) Int. Cl.[7] .............................................. G06F 17/00

(52) U.S. Cl. ...................... 713/168; 713/182; 713/171; 713/176

(58) Field of Search ................................ 713/182–186, 713/200–202; 7/168–174

(56) References Cited

U.S. PATENT DOCUMENTS

| | | | |
|---|---|---|---|
| 4,200,770 | A | 4/1980 | Hellman et al. |
| 4,799,061 | A | 1/1989 | Abraham et al. |
| 5,091,942 | A | 2/1992 | Dent |
| 5,148,479 | A | 9/1992 | Bird et al. |
| 5,237,612 | A | 8/1993 | Raith |
| 5,241,598 | A | 8/1993 | Raith |
| 5,280,250 | A | 1/1994 | Jayaweera et al. |
| 5,390,245 | A | 2/1995 | Dent et al. |
| 5,559,886 | A | 9/1996 | Dent et al. |
| 6,725,376 | B1 * | 4/2004 | Sasmazel et al. ........... 713/201 |
| 6,728,881 | B1 * | 4/2004 | Karamchetty ............... 713/186 |
| 6,728,882 | B2 * | 4/2004 | Gotoh et al. ................ 713/193 |

OTHER PUBLICATIONS

Elkeelany et al., Performance analysis of IPSec protocol: encryption and authentication, Communications, 2002, ICC 2002, IEEE International Conference on, vol. 2, Apr. 28–May 2, 2002, pp. 1164–1168, vol. 2.*

Chen, Authenticated encryption scheme based on quadratic residue, Electronics Letter, vol. 34, Issue 22, Oct. 29, 1998, pp. 2115–2116.*

Hadjichristofi et al., IPSec overhead in wireline and wireless networks for Web and email applications, Performance, Computing, and Communications Conference, 2003, Conference proceedings of the 2003 IEEE International, Apr. 9–11, 2003, pp. 543–547.*

* cited by examiner

*Primary Examiner*—David Jung
(74) *Attorney, Agent, or Firm*—Coats & Bennett, P.L.L.C.

(57) ABSTRACT

A method for bilateral identity authentication over a communication channel provides a secure method for authenticating the identity of the communicating parties and establishing a secret key. Each party computes an authentication challenge based on an exchanged value used in a key generation procedure. The authentication challenge is encrypted to the other party's public key. After receiving an encrypted authentication channel from the other party, each party deciphers the authentication challenge and generates an authentication response based on the authentication challenge. The authentication response includes bits that the challenging party cannot predict in advance to prevent fraudulent use of the authentication response by the challenging party or some other third party. After receiving an authentication response from the other party, each party verifies that the expected authentication response was received.

54 Claims, 8 Drawing Sheets

METHOD OF BILATERAL IDENTITY AUTHENTICATION

BACKGROUND OF THE INVENTION

The present invention relates generally to cryptographic methods and, more particularly, to authentication protocols using cryptographic methods to authenticate parties involved in a communication.

Encryption is the process of disguising intelligible information, called plaintext, to hide its substance from eavesdroppers. Encrypting plaintext produces unintelligible data called ciphertext. Decryption is the process of converting ciphertext back to its original plaintext. Using encryption and decryption, two parties can send messages over an insecure channel without revealing the substance of the message to eavesdroppers.

A cryptographic algorithm or cipher is a mathematical function used in the encryption and decryption of data. A cryptographic algorithm typically works in combination with a key to encrypt and decrypt messages. The key, typically a large random number, controls the encryption of data by the cryptographic algorithm. The same plaintext encrypts to different ciphertext with different keys. In general, it is extremely difficult to recover the plaintext of a message without access to the key, even by an eavesdropper having full knowledge of the cryptographic algorithm.

In general, there are two types of key-based cryptographic algorithms—symmetric algorithms and asymmetric algorithms. In symmetric algorithms, also called secret key algorithms, one key is used both for encryption and decryption. Symmetric algorithms require that the sender and receiver of the message agree on a secret key before they can communicate securely. One benefit of symmetric algorithms is that symmetric algorithms execute quickly in a microprocessor. However, key distribution can be a problem, particularly where the communicating parties are in different physical locations. The parties must agree to a key in secret, since anyone possessing the key can encrypt or decrypt messages. If the key is compromised, then an eavesdropper can decrypt any messages encrypted to that key. The eavesdropper could also pretend to be one of the parties and produce false messages to deceive the other party.

The Diffie-Hellman algorithm is a key exchange algorithm that allows two parties to agree on a secret key over an insecure channel without divulging the secret key. According to the Diffie-Hellman algorithm, the parties agree on two, non-secret prime numbers N and G. N is typically a large prime number. The security of the system is based on the difficulty of factoring numbers the same size as N. G may be a one-digit prime number. Each party generates a large random integer, denoted x and y, respectively. The parties then calculate derived numbers X and Y. The first party computes X using the equation $X=G^x$ mod N. The second party computes Y using the equation $Y=G^y$ mod N. The first party transmits X to the second party. The second party transmits Y to the first party. The first party computes the key K using the equation $K=Y^x$ mod N. The second party computes the key K using the equation $K=X^y$ mod N. K is equal to $G^{xy}$ mod N. An eavesdropper cannot compute K with knowledge, only of N, G, X, and Y. Therefore, the value K, which was computed independently by the two parties using information exchanged over the insecure channel, may be used by the parties as the secret key for secure communications. The Diffie-Hellman algorithm does not establish the identity of either party, but only allows them to communicate in privacy using the secret key K in a symmetric encryption device.

Asymmetric encryption algorithms, also known as public key algorithms, use different keys for encryption and decryption. The encryption key, also called the public key, can be made public. Anyone can use the public key to encrypt messages. The decryption key, also called the private key, is secret. Only a person with the private key can decrypt messages encrypted with the corresponding public key.

Using an asymmetric encryption algorithm, the sender encrypts a message using the public key of the intended recipient. Only the intended recipient can decipher the message using his private key. Since the private key is not distributed, public key algorithms avoid the problems of key exchange inherent in symmetric algorithms. However, public key algorithms are computationally complex and take longer to execute than symmetric algorithms.

One of the most popular public key algorithms is the RSA algorithm, named after its three inventors—Ron Rivest, Adi Shamir, and Leonard Adleman. The RSA algorithm is based on a modulus N which is the product of two large prime numbers P and Q. A public exponent E is chosen such that the public exponent E and (P-1)(Q-1) are relatively prime, which means they have no prime factors in common. The public exponent E does not have to be a prime number, but it must be smaller than the modulus N and it must be odd. The public exponent E is used to compute a private exponent D such that (DE-1) is evenly divisible by (P-1)(Q-1). This relationship may be written as DE=1 mod(P-1)(Q-1). The public key comprises the public exponent E and modulus N. The private exponent D is the private key.

In operation, the sending party divides message bits into blocks smaller than the word length of the modulus N to obtain a word of value X. The message block is encrypted by computing $Y=X^E$ mod N, which is a word of length equal to N. The encrypted message is transmitted to the receiving party. The receiving party can decrypt the message by computing $X=Y^D$ mod N where Y is the ciphertext.

The RSA algorithm and other public key algorithms allow secure communications between two parties, but do not provide means for authenticating the parties. When a person receives a message encrypted with his public key, he can be assured that the content of the encrypted message is secret from all but the sending party, since only he possesses the private key for decrypting the message. However, the party receiving the encrypted message has no assurance of the identity of the sending party, since anyone with his public key could have encrypted the message. If the receiving party desires to authenticate the sending party's identity, the sending party may encrypt a message with his secret key. The receiving party can then use the public key to decrypt the message. If the message decrypts successfully, only the sending party could have sent the message. In this case, the ability to authenticate messages has been preserved at the expense of completely giving up secrecy, since anyone with the sender's public key can decipher the message.

It is known to doubly encrypt messages to provide both secure communications and authentication capability. In this case, each party to the communication possesses a public key used for encrypting messages and a private key used for decrypting messages. Assume that party A wishes to send party B a message. Party A encrypts the message first, using party A's private key. The resulting ciphertext is encrypted a second time using party B's public key. The result of the second encryption operation is transmitted to party B. Party B decrypts the message using party B's private key. Since party B is the only person in possession of the private key, only he can decrypt the message so the communication is secure. The result of the first decryption operation is the inner ciphertext produced by encrypting the original message with party A's private key. Thus, party B can then use party A's public key to decrypt the inner ciphertext to obtain the original message. Since only party A possesses the private key that can generate the inner ciphertext, party A's identity is authenticated to party B.

Key certification authorities have been used in the past to provide a means for obtaining and/or verifying the public key of an intended recipient. The key certification authority issues digital certificates that include a person's public key and information identifying the person. The digital certificate is signed using the private key of the key certification authority. The signature of the key certification authority attests to the authenticity of the public key and the associated identity.

Digital certificates are used when it is necessary to exchange public keys with someone in a remote physical location. For smaller groups of people who wish to communicate securely, it is relatively easy to manually exchange diskettes or e-mails containing public keys. In cases where manual key distribution is not practical, a person can request a digital key certificate from the key certification authority to obtain the public key of the intended recipient. Thus, the key certification authority has an ongoing role to provide public keys upon request. The public key is distributed in the form of a key certificate signed by the key certification authority. To verify the public key, the sending party simply decrypts the key certificate with the public key of the key certification authority. If the key certificate is successfully decrypted, the public key is validated.

Another method used in the past for authenticating the identity of a party is the challenge response method. The sending party can encrypt a random message, known as the authentication challenge, which is sent to the intended recipient. The intended recipient encrypts the authentication challenge with his or her secret key and sends the reply, known as the authentication response, back to the sending party. The sending party can then decrypt the authentication response using the public key of the second party, which may be obtained from the key certification authority. If the authentication response is successfully decrypted, then the public key obtained from the key certification authority is assumed to be correct and can be used to send messages to the intended recipient.

BRIEF SUMMARY OF THE INVENTION

The present invention is a method for bilateral identity authentication over a communication channel. The present invention allows two parties to authenticate themselves to the other. The present invention further incorporates a key exchange algorithm, such as the Diffie-Hellman algorithm, to enable the parties to compute a session key for use in a symmetric ciphering algorithm.

According to the present invention, each party generates a random bitstring that is used to construct an authentication challenge. Each party encrypts the authentication challenge to the other party's public key and transmits the encrypted authentication challenge to the other party. The other party is expected to return an authentication response that depends on the other party being able to decipher the authentication challenge.

After receiving the encrypted authentication challenge from the other party, each party deciphers the authentication challenge and generates an authentication response based on the authentication challenge. The authentication response includes bits that the challenging party cannot predict in advance. In one embodiment, each party encrypts the authentication response using the session key computed as a function of the exchanged random bitstrings. Encryption of the authentication response with the session key produces bits that the other party cannot determine in advance since neither party alone is able to determine the session key. Alternatively, the challenged party can blend as yet unknown bits with the bits of the authentication challenge or may return a derivative of the authentication challenge, such as a hash of the authentication challenge.

After receiving an authentication response from the other party, each party verifies that the expected authentication response was received. If not, communications between the parties are terminated. If the identity of both parties is properly authenticated, communications can continue using the session key and a symmetric cipher algorithm.

DETAILED DESCRIPTION OF THE INVENTION

Figure 1:
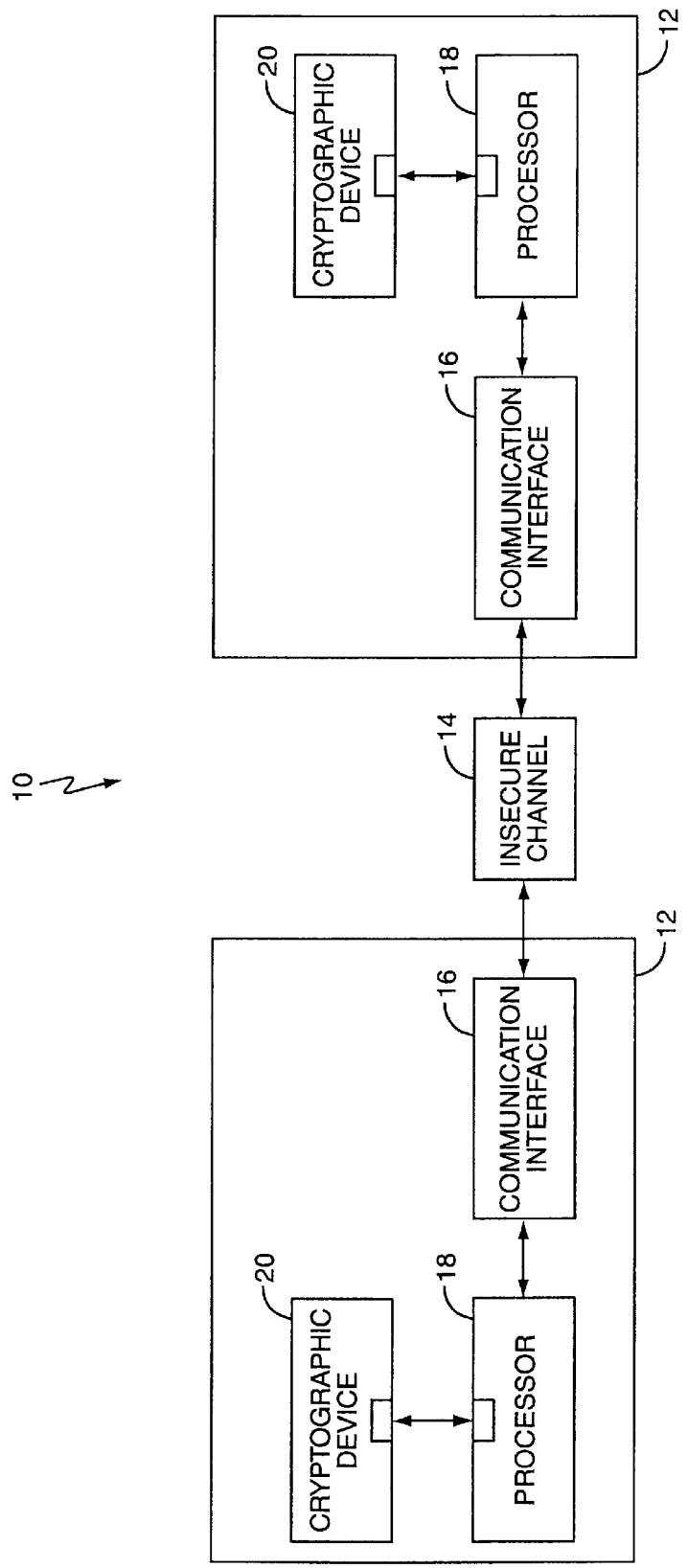
FIG. 1 is a block diagram of a cryptographic communication system.

FIG. 1 illustrates a schematic diagram of a cryptographic communication system 10 for transmitting and receiving encrypted messages over an insecure channel. The cryptographic communication system 10 includes two or more communication devices 12 for communicating over an insecure channel 14. Although only two communication devices 12 are illustrated, the communication system 10 may in fact comprises numerous communication devices 12.

The term "communication device" used herein refers to any device capable of transmitting and/or receiving information over a communication channel 14. The communication channel may be a wireline channel or a wireless channel. Communication devices may include: a cellular radiotelephone; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar and/or a global positioning system (GPS) receiver. The term communication device also encompasses computing devices, such as a personal computer, laptop computer, or palmtop computer, that includes a communications interface for communicating with other devices. Communication interfaces used in computing devices may for example comprise an Ethernet interface, serial interface, modem, radiotelephone transceiver, or any other interface typically used in a computer to communicate with other devices.

Each communication device 12 includes a processor 18, cryptographic device 20, and communication interface 16. Processor 18 controls the operation of the communication device 12 and may include either internal or external memory for storing control programs and data used during operation. Processor 18 may further perform some computational functions during the encryption and decryption steps of the communication. Processor 18, however, may not be a secure device such that data stored therein may be accessed by outside parties.

Cryptographic device 20 may be a secure, tamper-proof device that includes a processor and memory used for cryptographic calculations, e.g. encryption and decryption. Cryptographic device 20 may for example comprise a "smart card" or tamper-proof chip. Data computed and stored within the cryptographic device 20 cannot be accessed by an outside source thus providing security for the ciphering process. The cryptographic device 20 stores encryption variables, such as public and private keys, used in ciphering algorithms to encrypt and decrypt data. The encryption variables may be generated internally in the cryptographic device 20 to prevent the possibility of tampering or disclosure. Methods for generating and storing encryption keys and other encryption variables in a cryptographic device 20 are disclosed in a related U.S. Patent application entitled "Secure Storage of Ciphering Information Using a PIN Code" being filed simultaneously with this application, which is incorporated herein by reference. While shown in FIG. 1 as a separate device, the function of the cryptographic device 20 may in fact be incorporated into processor 18.

Figure 2:
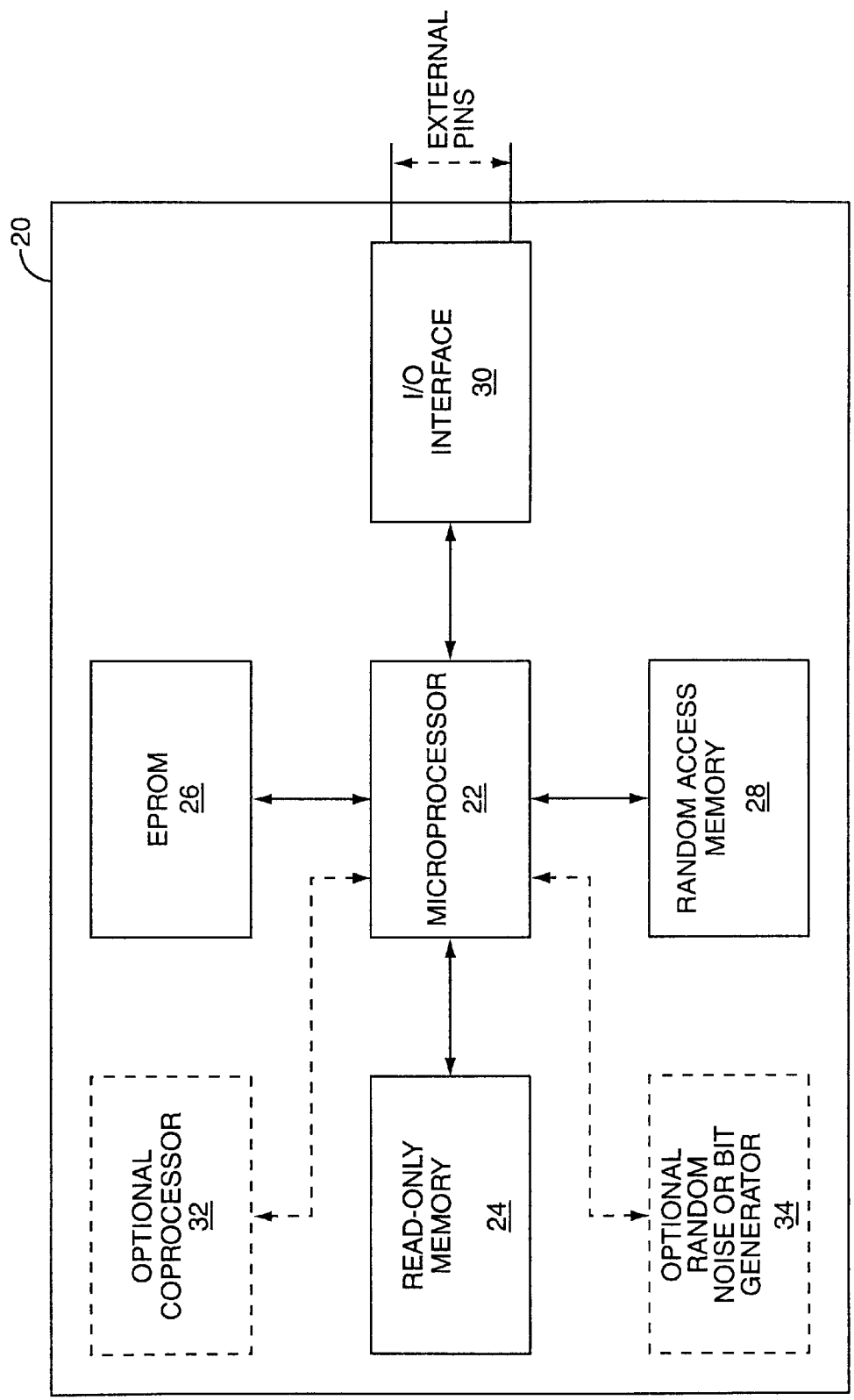
FIG. 2 is a block diagram of a communication device used in a cryptographic communication system.

FIG. 2 is a block diagram of a cryptographic device 20. Cryptographic device 20 comprises microprocessor 22, read-only memory 24, erasable programmable read-only (EPROM) 26, random access memory (RAM) 28, input/output (IO) interface 30, optional co-processor 32, and optional random number generator 34. The microprocessor 22 executes programs stored in read-only memory 24 and responds to digital codes presented to the microprocessor 22 on IO interface 30. The digital codes presented to the microprocessor 22 represent commands to be executed by the microprocessor 22. There are only a limited set of valid commands that may be executed by the microprocessor 22. Valid commands include, for example, requests to encipher or decipher data presented on the IO interface 30 and to return the result as output bits on the IO interface 30. Encryption and decryption may be performed using internally stored or externally supplied keys. When encryption is performed using a stored, long-term secret key, such as the private key of a public/private key pair, it is generally desirable that the encryption operation be performed internally by the microprocessor 22 and one or more co-processors in order to obviate the need for the secret key to be output to an external or off-chip device. In that case, there will be no legal command to request output of the private key to which the microprocessor 22 will respond. Thus, there may be, if necessary, a co-processor to accelerate computations of the sort necessary using public key encryption methods based on very large prime numbers.

Read-only memory 24 stores programs that are executed by microprocessor 22 and its co-processors, if present. The programs stored in read-only memory 24 determine the legal commands. Read-only memory 24 is typically factory programmed. The programs stored therein are unalterable to prevent tampering.

EPROM 26 stores user-specific data or other data that must be field programmed. This includes the user's identity certificate and public-key/private-key pair and the associated modulus. The public key may be a relatively small denature of one to eight decimal digits. The public key is typically published in a catalog or database along with the encryption modulus and user's identity. The encryption modulus is typically 2048 bits (256 bytes) and the private key is on the same order of word length. The public key, encryption modulus, and private key are initially stored in EPROM 26 but, during initialization, the public key and encryption modulus may be erased from memory. Further, the private key may be modified during the initialization process to eliminate random digits corresponding to the user's PIN code. The modified private key, for example, may have some missing digits which have to be filled in by the user to complete the private key. For example, two bytes of the private key could be left blank and the missing 16 bits grouped to form a 4-digit, hexadecimal PIN code, e.g., 5C1F. The previously mentioned U.S. Patent application entitled "Secure Storage of Ciphering Information Using a PIN Code" describes a method for storing a deficient private key which is effective only when a user's PIN code is entered.

Figure 3A:
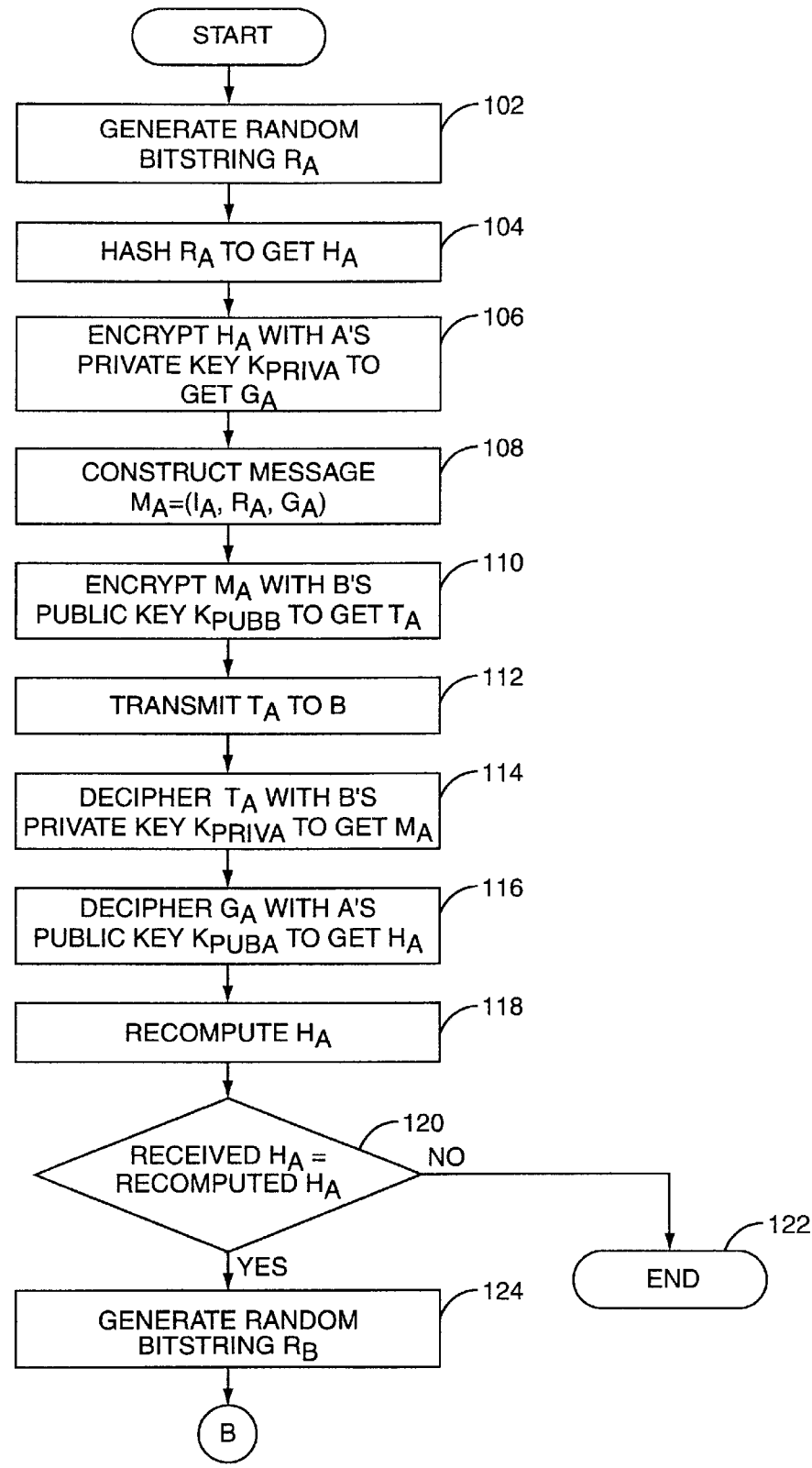
FIGS. 3A and 3B comprise a flow chart of an exemplary bilateral authentication procedure according to the present invention.
Figure 3B:
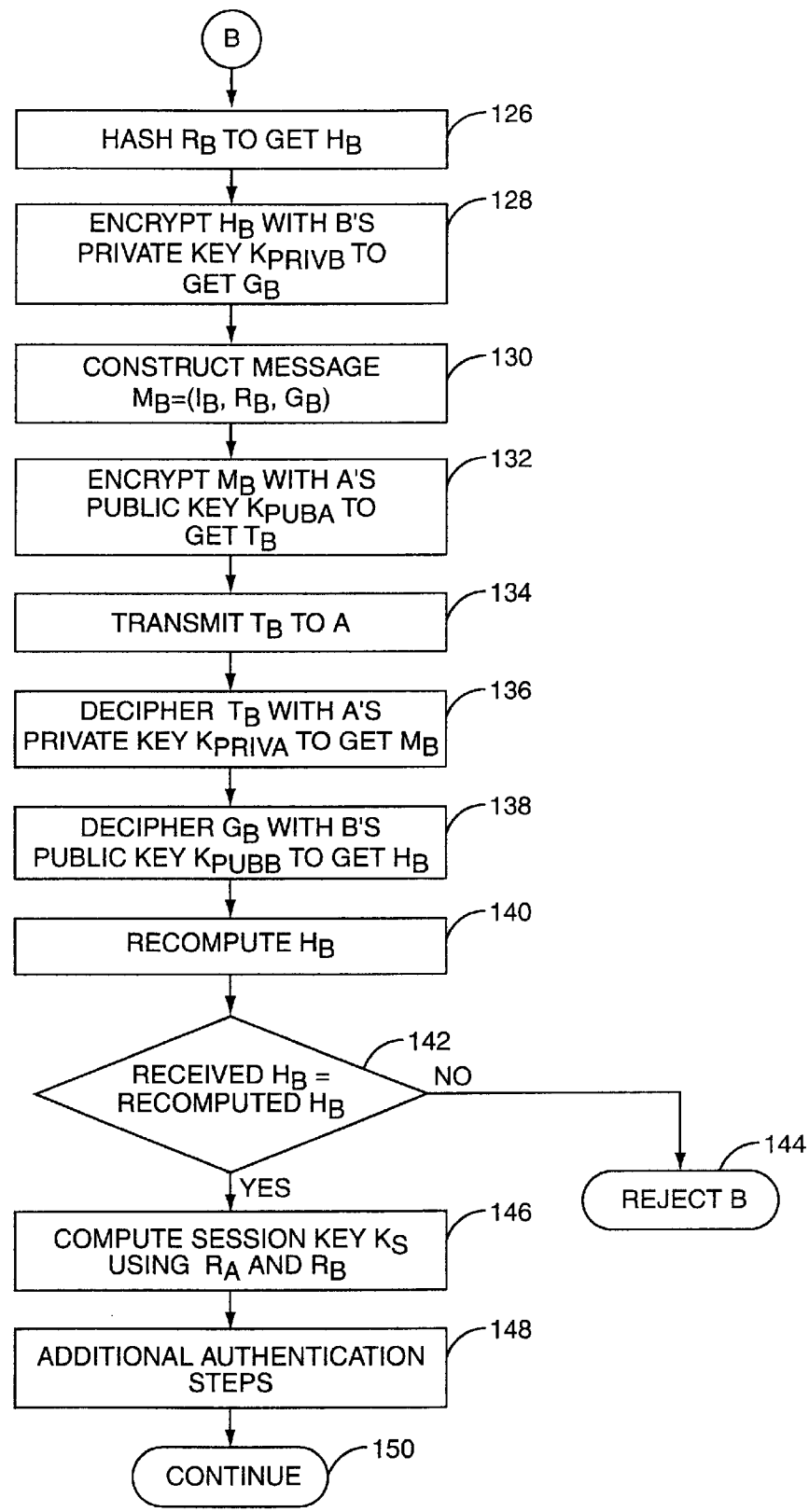

FIGS. 3A and 3B illustrate a bilateral authentication procedure executed by cryptographic device 20 for initiating secure communications between two parties. The protocol of FIGS. 3A and 3B uses a public key cryptosystem to authenticate each party to the other and to exchange random numbers used to generate a session key. The session key can then be used in a symmetric algorithm to engage in secure communications.

To start the protocol, party A generates a random bitstring $R_A$ at step 102 The random bitstring $R_A$ may be generated, for example, by quantizing a noise source. A hashes the random bitstring $R_A$ at step 104 using a one-way hash function to generate a hash code $H_A$. A hash function is a one-way function that takes a variable length input string, called a pre-image, and converts it to a fixed length string, called the hash code. The pre-image in this case is the random bitstring $R_A$, or selected portions thereof. A one-way hash function operates in only one direction. While it is easy to compute a hash code from the pre-image, it is computationally impractical to find a pre-image that produces a given hash code. Thus, it is practically impossible to recover the pre-image given the hash code and knowledge of the hash function. Another feature of a hash function is that it is difficult to find any two pre-images that produce the same hash code.

In step 106, A encrypts the hash code HA with his private key $K_{PRIVA}$ to obtain an encrypted hash code, denoted $G_A$. The private key $K_{PRIVA}$ is part of a key pair ($K_{PRIVA}$, $K_{PUBA}$) used in a public key cipher algorithm. The cipher algorithm used for encrypting the hash code $H_A$ may, for example, be the RSA algorithm. The RSA algorithm is described in U.S. Pat. No. 4,405,829, which is incorporated herein by reference.

The encrypted hash code $G_A$ is then combined at step 108 with the identity of A, denoted $I_A$, and the random bitstring $R_A$ to generate a message $M_A$. Thus, $M_A=(I_A, R_A, G_A)$. At step 110, A encrypts the message $M_A$ using B's public keys $K_{PUBB}$ to generate an encrypted message $T_A$. Public key $K_{PUBB}$ is part of a key pair ($K_{PRIVB}$, $K_{PUBB}$) used in a public key cryptosystem. At step 112, A transmits the encrypted message $T_A$ to B. The encrypted message $T_A$ may be protected by error correction or error detection coding to ensure that B receives the encrypted message $T_A$ free of errors.

At step 114, B deciphers the encrypted message $T_A$ using B's private key $K_{PRIVB}$ to recover message $M_A$, which B repartitions to obtain A's identity $I_A$, random bitstring $R_A$, and encrypted hash code $G_A$. At step 116, B deciphers $G_A$ using A's public key $K_{PUBA}$ to recover the received hash code $H_A$. B may obtain A's public key from a key certification authority which also contains A's identity $I_A$. B may also obtain A's public key directly from A or may have previously obtained A's key certificate and stored it in memory, eliminating the need to contact the key certification authority each time.

At step 118, B recomputes the hash code, denoted $\overline{H}_A$, directly from the received random bitstring $R_A$, which was contained in message $M_A$. At step 120, B compares the received hash code $H_A$ and recomputed hash code $\overline{H}_A$. If the locally recomputed hash code $\overline{H}_A$ does not match the received hash code $H_A$, B rejects A's claimed identity and terminates the procedure (block 122). In this case, A may attempt communication again, and B may black-list A upon several failed attempts.

Assuming that the received hash code $H_A$ and recomputed hash code $\overline{H}_A$ match, B repeats the procedure in the reverse direction. B generates a random bitstring $R_B$ (step 124) and hashes the random bitstring $R_B$ to generate a hash code, denoted $H_B$ (step 126). At step 128, B encrypts the hash code $H_B$ with B's private key $K_{PRIVB}$ to obtain an encrypted hash code denoted $G_B$. At step 130, B combines the encrypted hash code $G_B$ with B's identity, denoted $I_B$, and the random bitstring $R_B$ to construct a message $M_B$. Thus, $M_B=(I_B, R_B, G_B)$. At step 132, B encrypts message $M_B$ with A's public key $K_{PUBA}$ to obtain an encrypted message denoted $T_B$. The encryption operation performed at step 132 uses a public cipher algorithm, such as the RSA algorithm. B transmits the encrypted message $T_B$ to A at step 134. The encrypted message $T_B$ may be protected by error correction and/or error detection codes to ensure that the encrypted message $T_B$ is received by A without error. At step 136, A deciphers $T_B$ using A's private key $K_{PRIVA}$ to recover the message $M_B$ and partitions $M_B$ into its constituent elements $I_B$, $R_B$, and $G_B$. At step 138, A deciphers $G_B$ with B's public key $K_{PUBB}$ to get the encrypted hash code $H_B$ transmitted by B. A recomputes the hash code, denoted $\overline{H}_B$, at step 140 using the random bitstring $R_B$ received from B. At step 142, A compares the received hash code $H_B$ and locally-computed hash codes $\overline{H}_B$, for equality. If the received hash code $H_B$ and locally-computed hash codes $\overline{H}_B$ do not match, A rejects B's claimed identity (block 144) and terminates the procedure. If the hash codes $H_B$ and $\overline{H}_B$ match, the claimed identity of B is authenticated to A and the protocol continues.

The random bitstrings $R_A$ and $R_B$ exchanged during the authentication portion of the protocol are used to generate a session key $K_S$ for a symmetric algorithm used in further communications between A and B. A and B compute the session key $K_S$ at step 146. At step 148, additional authentication steps could be performed to enhance the security of the authentication procedure as will be described below. After performing the additional authentication steps, if any, the parties may continue to communicate using the session key $K_S$ to encrypt and decrypt messages.

To compute the session key $K_S$ at step 146, a symmetric key generating function may be used so that the same value is computed when the random bitstrings $R_A$ and $R_B$ are interchanged in the key generating function. That is, a key generating function is used to compute the session key $K_S$ such that $FUNC(R_B, R_A)=FUNC(R_A, R_B)$. For example, $R_A$ bitwise modulo-2 added to $R_B$ has this symmetric property. This simple combinatorial function, however, would allow B to determine the session key $K_S$ alone by making $R_B$ equal to $R_A$ plus $K_S$. It is not desirable to allow one party alone to establish the session key $K_S$. The ability to predetermine the session key $K_S$ could be used for some nefarious purpose. Thus, the key generating function chosen to compute the session key $K_S$ should make it difficult for either party alone to determine the session key $K_S$. A function in the form $K_S=(R_A^{R_B}+R_B^{R_A})\bmod N$ where N is a large prime number could be used as a key generating function. This key generating function is a symmetrical function which gives the same session key $K_S$ when $R_A$ and $R_B$ are interchanged. However, this key generating function makes it extremely difficult for party B to select the session key $K_S$ except by an impossible amount of trial and error. Those skilled in the art, however, will recognize that other symmetric functions exist which make it difficult for one party to determine alone the session key $K_S$ and that the present invention is, therefore, not limited to a particular key generating function.

Using the protocol of FIGS. 3A and 3B, it is still possible for a fraudulent party to deceive one of the parties. For example, the fraudulent party may have previously recorded the message $T_A$ which authenticates A to B. The fraudulent party can use the recorded message to attempt communication with B while masquerading as A. If communications thereafter are encrypted with $K_S$, the fraudulent party would not be able to continue, but the protocol of FIGS. 3A and 3B does not authenticate A to B. Because a security procedure terminating in a definitive authentication of both parties may execute on a different processor than the one used thereafter to continue the transaction, or may execute in a different software context which is required to return an indication of authentication, it is necessary to extend the authentication protocol to include an attempt to communicate using $K_S$ as shown in FIGS. 4A and 4B.

Figure 4A:
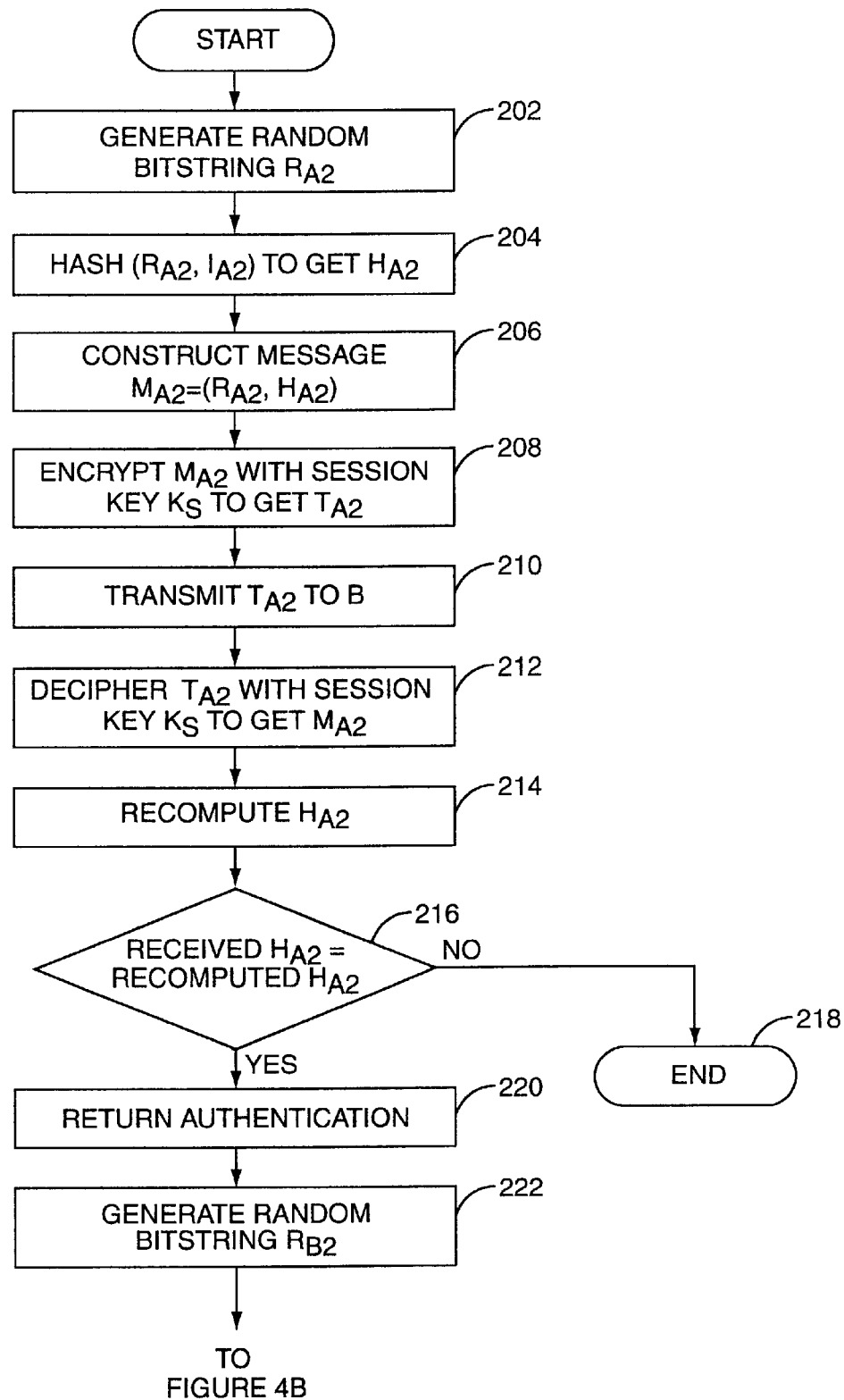
FIGS. 4A and 4B comprise a flow chart illustrating additional authentication steps to improve security of the bilateral authentication procedure of FIGS. 2A and 2B.
Figure 4B:
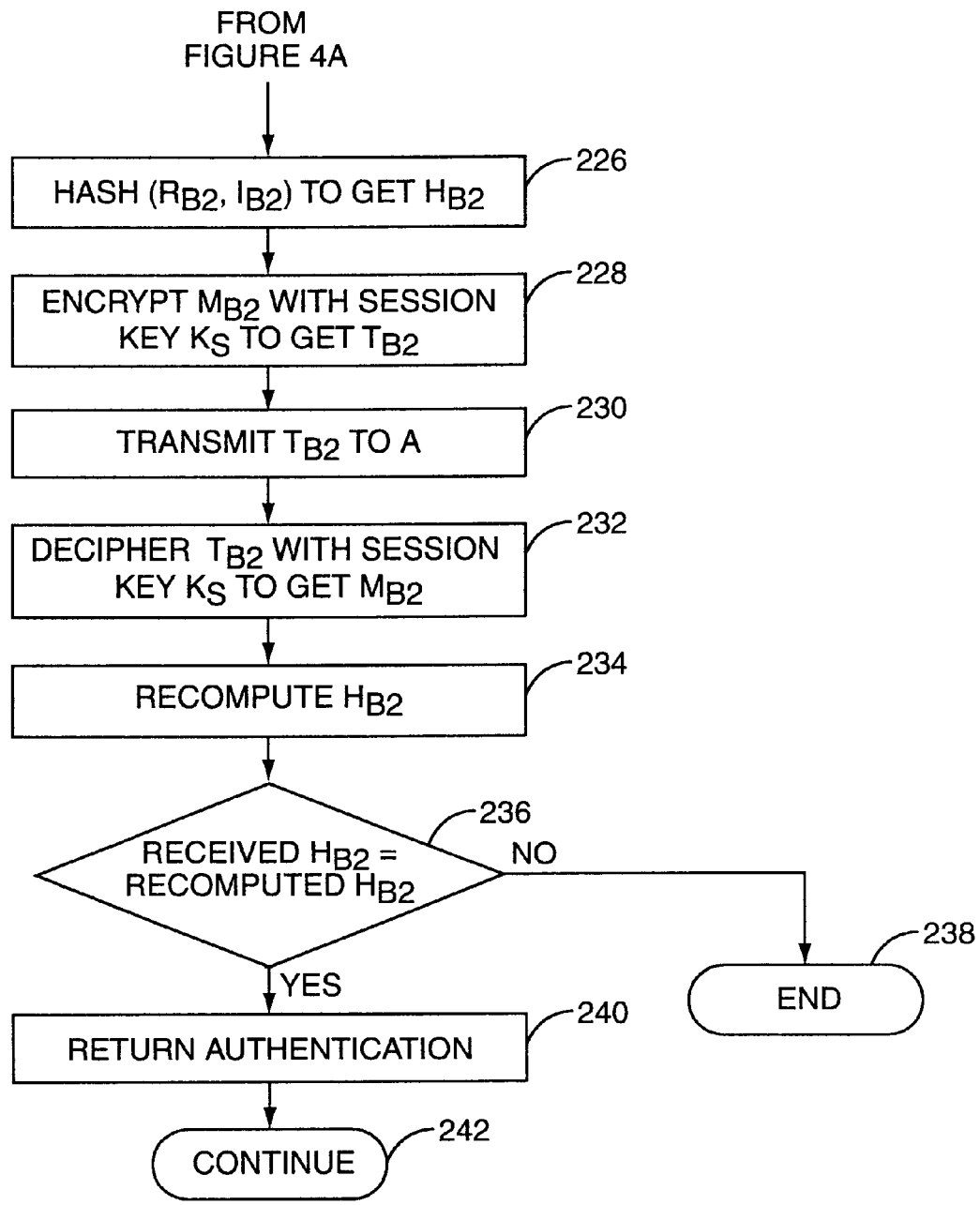

FIGS. 4A and 4B illustrate an extension of the protocol shown in FIGS. 3A and 3B needed to complete authentication of the parties. At step 202, party A generates a second random bitstring $R_{A2}$ to send to B. At step 204, A combines the second random bitstring $R_{A2}$ with A's identity $I_A$ and hashes the resulting value to obtain a second hash code $H_{A2}$. A constructs a second message $M_{A2}$ using the second bitstring $R_{A2}$ and the second hash code $H_{A2}$ at step 206. At step 208, A encrypts the second message $M_{A2}$ using the session key $K_S$ computed in step 146 and a symmetric cipher, such as triple-DES, to produce an encrypted message $T_{A2}$. A transmits the encrypted message $TA_2$ to B at step 210 using error correction and/or error detection coding to ensure that B receives the encrypted message $T_{A2}$ without error.

At step 212, B deciphers the encrypted message $T_{A2}$ using the session key $K_S$ to obtain the second message $M_{A2}$, which B separates into the second random bitstring $R_{A2}$ and the second hash code $H_{A2}$. B recomputes the second hash code, denoted $\overline{H}_{A2}$, using the received second random bitstring $R_{A2}$ and the identity $I_A$ of A extracted from the first message $M_A$ at step 114. B compares the recomputed second hash code $\overline{H}_{A2}$ with the received second hash code $H_{A2}$ at step 216. If the received second hash code $H_{A2}$ and the recomputed second hash code $\overline{H}_{A2}$ do not match, B terminates the communication (step 218). If the received second hash code $H_{A2}$ matches the recomputed second hash code $\overline{H}_{A2}$, then A's claimed identity is authenticated. The authentication process returns A's authenticated identity $I_A$ to the calling process at step 220. B then repeats the procedure in the reverse direction.

At step 222, B computes a second random bitstring $R_{B2}$, which must be different than $R_{A2}$, otherwise A must reject it.

B combines the second random bitstring $R_{B2}$ with B's identity $I_B$ and hashes the resulting string at step 224 to obtain a second hash code $H_{B2}$. B combines the second hash code $H_{B2}$ with the second random bitstring $R_{B2}$ to generate a second message $M_{B2}$ at step 226 and encrypts the second message using the session key $K_S$ to obtain an encrypted message $T_{B2}$ at step 228. At step 230, B transmits the encrypted message $T_{B2}$ to A using error correction and/or error detection coding to ensure that the encrypted message $T_{B2}$ is received by A without error.

At step 232, A deciphers the encrypted message $T_{B2}$ with the session key $K_S$ computed at step 146 to obtain the second message $M_{B2}$, which B then separates into the second random bitstring $R_{B2}$ and the second hash code $H_{B2}$. At step 234, A recomputes the second hash code, denoted $\overline{H}_{B2}$, using the received second random bitstring $R_{B2}$ and B's identity $I_B$. A compares the recomputed second hash code $\overline{H}_{B2}$ with the received second hash code $H_{B2}$ at step 236. If the recomputed second hash code $\overline{H}_{B2}$ does not match the received second hash code $H_{B2}$, then A terminates the communication at step 238. If the values match, B's claimed identity is authenticated. The authentication process returns B's identity $I_B$ to the calling process at step 240. Further communications between A and B can continue using the session key $K_S$ (step 242).

Using the extended authentication protocol of FIGS. 3A and 3B ensures that an eavesdropper who had previously intercepted $T_A$ cannot masquerade as A. Assuming that $T_A$ was previously intercepted by an eavesdropper, the eavesdropper would still not know the value of the first random bitstring $R_A$ and, therefore, cannot compute the session key $K_S$ nor complete the extended authentication process shown in FIGS. 4A and 4B.

In modern society, many forms of communications are used for transactions between parties including voice, e-mail, and e-commerce. Not all such communications require encryption using a session key $K_S$. Therefore, there is a danger that messages recorded in one context could be useful in another. Due to the protocols used in different contexts being determined by different standardization groups, coordination to prevent such dangers is difficult.

Figure 5:
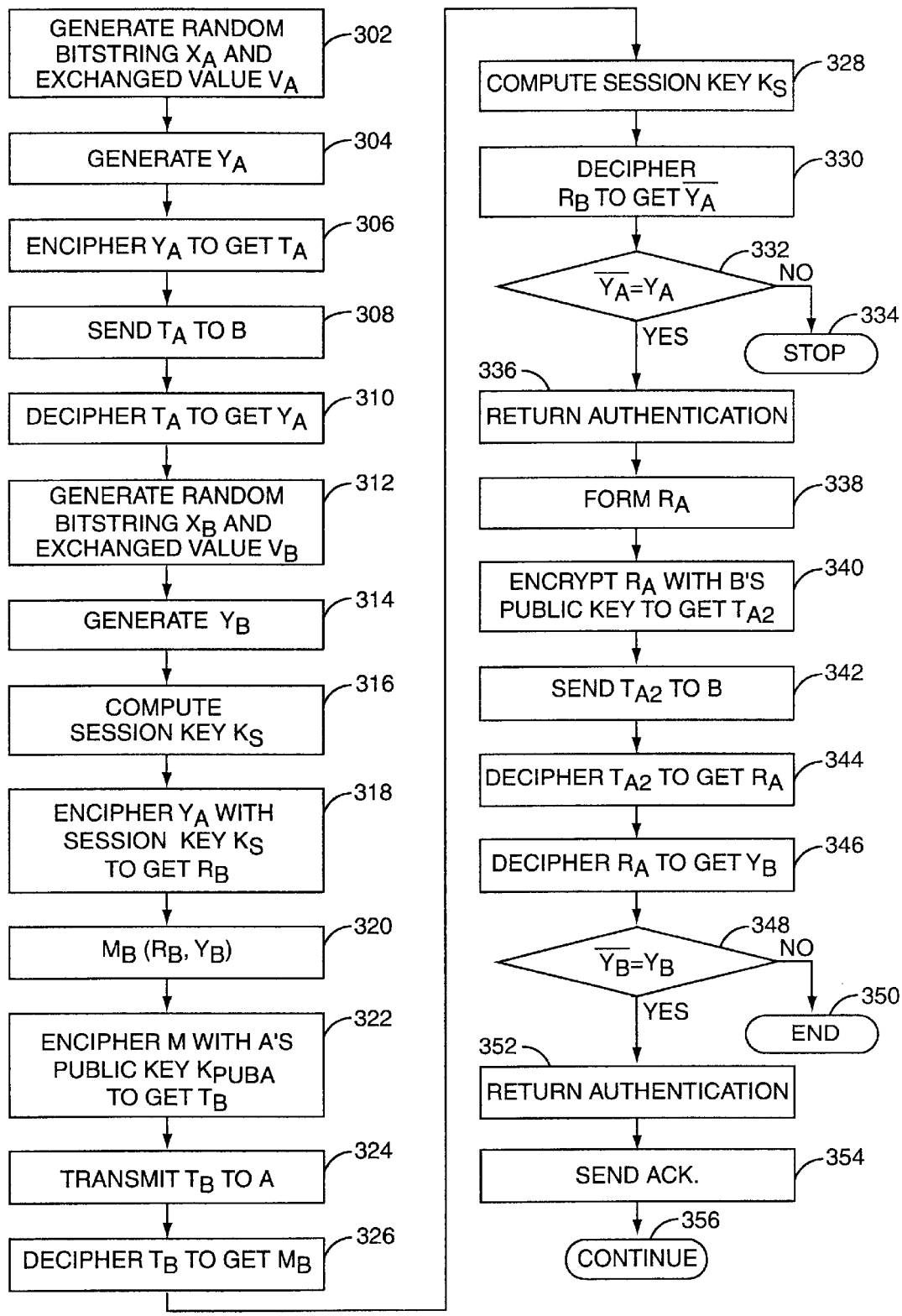
FIG. 5 comprises a flow chart illustrating a challenge response bilateral authentication procedure according to the present invention.

To prevent messages recorded in one context from being used in another, a challenge response authentication method, as shown in FIG. 5, could be used. In the challenge response authentication method of FIG. 5, A enciphers a random bitstring supplied by B and vice versa. The challenge response authentication method of FIG. 5 provides further protection against a fraudulent party who was able to penetrate the public key encryption layer of the public key cipher algorithm and is then able to calculate the session key $K_S$. This latter possibility is prevented by incorporating the Diffie-Hellman algorithm as one step in the computation of the session key $K_S$.

FIG. 5 shows an exemplary embodiment of the challenge response authentication method of the present invention. In FIG. 4, it is assumed that A has already obtained and verified B's public key $K_{PUBB}$ and vice versa. The public keys $K_{PUBA}$, $K_{PUBB}$ may be obtained by manual key distribution, or may be downloaded from a key certification authority. If the parties have communicated before, the key certificates may be stored in the parties' computers. Also, the details of the communication protocol necessary to ensure that messages are ultimately received error free have likewise been omitted. These communication protocols include error coding and decoding, packetization, acknowledgment of packets, etc. The details of communications protocols will vary depending on context and are not material to the invention.

A initiates communications with B by generating a random bitstring $X_A$ and computing an exchanged value $V_A$ using the random bitstring $X_A$ at step 302. The exchanged value $V_A$ is computed using a non-reversible function, such as Diffie-Hellman exponentiation, i.e., $V_A=[P1^{XA}]\bmod P2$. The Diffie-Hellman algorithm is described in U.S. Pat. No. 4,200,770, which is incorporated herein by reference.

The exchanged value $V_A$ is used to construct an authentication challenge $Y_A$ at step 304. In one embodiment, the exchanged value $V_A$ is used as the authentication challenge $Y_A$. The authentication challenge $Y_A$ could, however, include other information in addition to the exchanged value $V_A$.

A enciphers the authentication challenge $Y_A$ using B's public key $K_{PUBB}$ to obtain an encrypted authentication challenge $T_A$ at step 306. The encrypted authentication challenge $T_A$ is transmitted at step 308 to B using error detection and/or error correction coding to ensure that the encrypted authentication challenge is received by B error free.

B receives the encrypted authentication challenge $T_A$ and deciphers it at step 310 using his private key $K_{PRIVB}$ to obtain the authentication challenge $Y_A$ from which the exchanged value $V_A$ is extracted. At step 312, B generates a second random bitstring $X_B$, which is used to compute a second exchanged value $V_B$. Exchanged value $V_B$ may also be computed by Diffie-Hellman exponentiation, i.e., $V_B=[P1^{XB}]\bmod P2$. The exchanged value $V_B$ is used by the second party to construct a second authentication challenge $Y_B$ at step 314, which comprises the second exchanged value $V_B$ and may comprise additional data. In step 316, B calculates a session key $K_S$ by raising the exchanged value $V_A$ received from A to the power of random number $X_B$ modulo prime number P2 ($K_S=V_A^{XB} \bmod P2$).

In order to authenticate himself, B is supposed to return the value $Y_A$ to A to verify to A that B was able to decipher the authentication challenge $Y_A$, thus confirming that B is in possession of the private key $K_{PRIVB}$. However, enciphering a random value provided by another presents a security weakness. Therefore, B should not cipher or decipher an arbitrary bitstring provided by another party and simply return the result. This would be tantamount to allowing another party the use of B's private key $K_{PRIVB}$, abrogating all of the security that secrecy of the private key $K_{PRIVB}$ is supposed to provide. This outcome is avoided in the present invention by first altering $Y_A$ at step 318 so that at least part of the returned bits are not expected. In one embodiment, $Y_A$ is altered by ciphering it with the just-calculated session key $K_S$, using a symmetric cipher, such as triple-DES, to obtain a first authentication response $R_B$. B combines the authentication response $R_B$ with B's authentication challenge $Y_B$ to construct an authentication response message $M_B$ at step 320. B encrypts the authentication response message $M_B$ using A's public key $K_{PUBA}$ and encryption modulus $N_A$ at step 322 to obtain an encrypted message $T_B$. B transmits the encrypted message $T_B$ to A at step 324 using error detection and error correction coding to ensure that the ciphered authentication response message $T_B$ is received by A error free.

At step 326, A receives and deciphers the encrypted authentication response message $T_B$ using A's private key $K_{PRIVA}$ to recover the authentication response message $M_B$, which A then divides into its constituent parts, $R_B$ and $Y_B$. If the exchanged value $V_B$ is combined with other data, the exchanged value $V_B$ is extracted from $Y_B$. A then computes the session key $K_S$ by raising $V_B$ to the power of A's random bitstring $X_A$ modulo P2 ($K_S = V_B^{XA}$ mod P2) at step 328. After computing the session key $K_S$, A can then use the session key $K_S$ and the agreed-upon symmetrical cipher algorithm to decipher the first authentication response $R_B$ at step 330 to obtain the returned authentication challenge, denoted $\overline{Y}_A$. A compares, at step 332, the returned authentication challenge $\overline{Y}_A$ to the authentication challenge originally transmitted to B. If the values do not match, A terminates the communication (step 334). If the values match, B's identity is authenticated to A and the authentication process returns B's authenticated identity to the calling process (step 336).

At this point, B has not yet been able to verify A's claimed identity since the original message from A to B did not include data identifying A. Such data could have been sent, as in FIG. 1, but such one-way identity claims are flawed as the bitstring can be recorded by an eavesdropper and used at a later time. FIG. 5 thus continues so that A now verifies his identity to B by returning B's authentication challenge $Y_B$. Authentication challenge $Y_B$ is optionally enciphered using the session key $K_S$ to obtain a second authentication response $R_A$ at step 338. A may optionally encipher the second authentication response $R_A$ using B's public key $K_{PUBB}$ to obtain an encrypted authentication response $T_{A2}$ at step 340 and transmits the encrypted authentication response $T_{A2}$ to B at step 342 using error detection and error correction coding to ensure that the enciphered authentication response $T_{A2}$ is received by B error free.

At step 344, B deciphers the encrypted authentication response $T_{A2}$ received from A using B's private key $K_{PRIVB}$. B then deciphers the second authentication response $R_A$ using the session key $K_S$ (step 346) to obtain a returned authentication challenge $\overline{Y}_B$ and compares the returned authentication challenge $\overline{Y}_B$ with the original authentication challenge $Y_B$ (step 348). If the values match, A's identity is authenticated to B and the authentication process returns A's authenticated identity to the calling process (step 352). If the values do not match, B terminates the process (step 350).

The problem of enciphering or deciphering a random bitstring provided by another can be addressed without the necessity of ciphering the authentication challenge $Y_A$ to obtain authentication response $R_B$ at step 318. For example, if the bits of the authentication challenge $Y_A$ are interleaved with the bits of the authentication challenge $Y_B$ (of which A has yet no knowledge) in such a way that the cipher algorithm enciphers blocks containing 50% $Y_A$ bits and 50% $Y_B$ bits, then A is denied access to $Y_A$ alone ciphered with B's private key $K_{PRIVB}$ In this variation, it is not necessary to encipher $Y_A$ at step 318. While not required, the ciphering of $Y_A$ at step 318 nevertheless provides a useful function, namely the direct confirmation to A that the parties have successfully established a session key $K_S$ in common.

Other methods of denying a party effective use of another party's private key can be devised, other than the two examples given in the preceding paragraph. The general principle employed in both of these examples is to ensure that the authentication response that is ciphered with the challenged party's private key comprises bits that the challenging party cannot predict in advance, as well as the authentication response that the challenging party expects. This was ensured in the first example by enciphering the authentication challenge $Y_A$ using the session key $K_S$ at step 318 which depends on a random number $Y_B$, which the challenging party does not yet know, to obtain the authentication response $R_B$. In the second example, unpredictability is ensured by blending as yet unknown bits of the second authentication challenge $Y_B$ with the bits of the first authentication challenge $Y_A$ so that the resulting authentication response $R_B$ contains a substantial number of unpredictable bits.

Another technique that can be used, either alternatively or in addition to those described above, is to return an authentication response $R_B$ based on a subset of the bits in the authentication challenge $Y_A$, yet still sufficient to verify that the deciphering was successful beyond reasonable doubt. For example, if the authentication challenge $Y_A$ received by the challenged party comprises 1024 bits, which after deciphering still comprises 1024 bits, it could be sufficient to return a 64-bit response based on those bits rather than the entire authentication challenge $Y_A$. The 64 bits should not be a fixed selection of the 64 bits, since that would reveal bits of the deciphered plaintext which the original sender had never expected to be revealed. Thus, the 64-bit authentication response $R_B$ could be calculated at step 318 by a non-linear hash function over the 1024 deciphered bits of the authentication challenge $Y_A$ to generate a 64-bit hash code which serves as the authentication response $R_B$. The 64-bit hash code would then be returned to the challenging party, i.e., party A in this example, where it could verify the authentication response $R_B$ by hashing the original authentication challenge $Y_A$ and comparing the computed hash code with the received hash code. Using this method, no bit of the 1024 plaintext bits of the authentication challenge $Y_A$ are revealed to a person that intercepts the response. If the received hash code matches the recomputed hash code, this proves that B was able to decipher the authentication challenge $Y_A$ and, therefore, proves B's identity to A. The same method can be used at step 338 by party A to form the authentication response $R_A$.

Another variation is to compute the hash code over the deciphered authentication challenge $Y_A$, $Y_B$, and session key $K_S$ at steps 318 and 338. This variation provides a means to check not only that the authentication challenge $Y_A$, $Y_B$ was successfully deciphered, but also that both parties have the same session key $K_S$. Since the hash function would have two inputs, namely the deciphered authentication challenge $Y_A$, $Y_B$ and the session key $K_S$, this method can be considered as a form of ciphering the authentication challenge $Y_A$, $Y_B$ using the session key $K_S$. This solution, however, results in information loss since the enciphering algorithm has no corresponding deciphering algorithm. In this variation, deciphering the authentication response $R_B$ at step 330 and deciphering authentication response $R_A$ at step 346 must be replaced with hashing the authentication challenge $Y_A$, $Y_B$ with the session key $K_S$ to obtain an expected value of $R_A$, $R_B$, and then comparing the received value with the expected value.

There is one remaining step in completing the full identity verification that has been neglected in the prior art of bilateral authentication. That is, A cannot prove that B has verified A's identity. A can only prove that B thinks he is talking to A. In some circumstances, it may be important for A to prove that B not only surmised that he is talking to A, but had actual proof of that fact. However, if communications now continued in enciphered mode, and the initiative at this point lies with B, the next transmission from B to A will establish the proof that A might need. For example, B may now transmit an acknowledgement of correct messages received to A at step 354, enciphered with the session key $K_S$, and the initiative is back with A, who originally initiated the transaction, to continue at step 356.

The authentication procedure of FIG. 5 may provide a foundation for secure transactions which, in the future, may be the dominant method by which commerce takes place using the Internet. Using modern digital processors and chip technology, the authentication procedure can be completed in fractions of a second. Additionally, the incorporation of the Diffie-Hellman algorithm for establishing the session key $K_S$ ensures that the session key $K_S$ cannot easily be computed by an eavesdropper, even if the eavesdropper is able to penetrate the public key encryption layers to obtain the exchanged values $V_A$ and $V_B$.

Further modifications to the authentication procedure of FIG. 5 are possible to prevent fraud. It has been mentioned earlier that certain transactions are fraud-proof only if neither party alone can determine what the session key $K_S$ will be and, in particular, cannot determine the session key $K_S$ to be the same as the session key $K_S$ used before in a different transaction. The Diffie-Hellman key exchange comprises A sending a number $V_A$ to B, and B combining it with a random bitstring $X_B$ that B chooses to get the session key $K_S$. This enables B to choose the session key $K_S$ by appropriate selection of a number $V_B$. In principle, the party who was last to provide his input to determining the session key $K_S$ always has an opportunity to try to influence the outcome. To prevent a party from computing a predetermined session key $K_S$, the present invention may employ the key generating function shown in FIG. 6.

Figure 6:
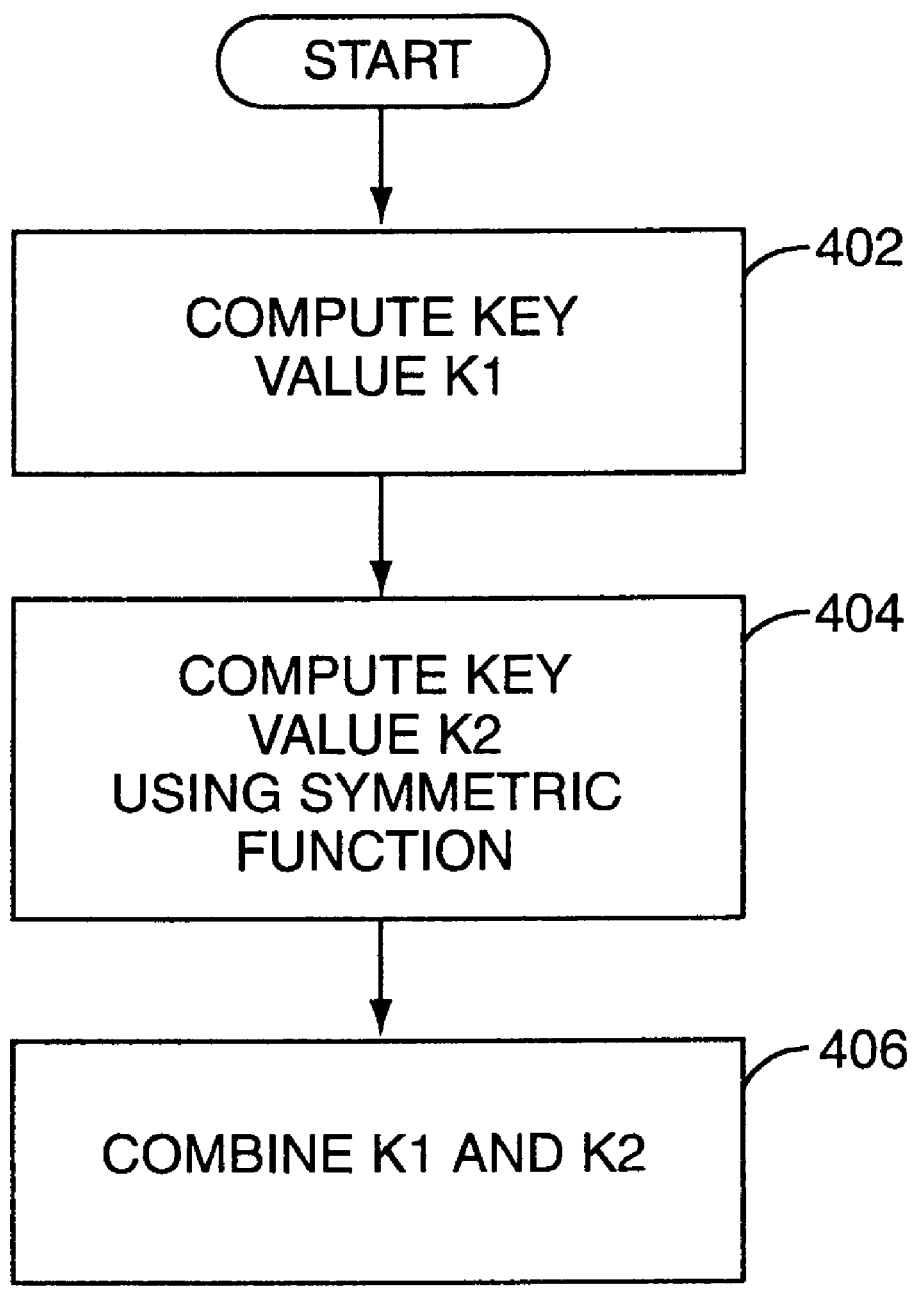
FIG. 6 is a flow-chart illustrating a key generating procedure according to the present invention.

Referring to FIG. 6, a key generating procedure useful in connection with the present invention is shown. At step 402, each party computes a first key value K1 according to the Diffie-Hellman algorithm. B computes the first key value K1 using the equation $K1=V_A^{XB}$ mod P2. B computes the first key value using the equation $K1=V_B^{XA}$ mod P2. At step 404, each party computes a second key value K2 using a symmetrical function and the exchanged values $V_A$ and $V_B$. The exchanged values $V_A$ and $V_B$ are already available and, thus, are used to generate the second key value K2. However, it is not necessary that the exchanged values $V_A$ and $V_B$ be used in this step. Instead, the protocol could be modified to allow the parties to exchange values $Z_A$ and $Z_B$, which are then used to generate the second key value K2. The use of a symmetrical function is not essential, but is used because it allows the same function to be employed at both ends. The first key value K1 and second key value K2 are then combined at step 406, for example, by modulo-2 addition, to compute the secret key $K_S$.

A symmetric function is used to generate the second key value K2 at step 404. The second value K2 could be computed using the equation $K2=(V_A * V_B)$ mod P2, where "*" stands for any commutative binary operator, such as "+" or "x." The same modulus P2 is used here because a procedure for modulo-P2 reduction will already have been established, but any other mutually-agreed modulus, such as P3, could be used. Another possibility is using the equation $K_{mod}=(V_A^{VB} * V_B^{VA})$ mod P2. The first-mentioned symmetric function is probably adequate and is less computationally complex than the second. For B to influence the outcome of $K_S$, it would then have to solve the equation $V_A^{XB}$ mod P2$\oplus_2$ $(V_A * V_B)$ mod P2=$K_S$ for $X_B$ given $V_A$, P2, and a desired secret key $K_S$. This would require extremely laborious trial and error. The secret key $K_S$ is then computed by bitwise adding the first and second parts. The value of the secret key $K_S$ could then be used in the subsequent ciphering and deciphering operations.

The present invention provides secure communications between two corresponding parties with bilateral authentication of their identities to each other. Additionally, the present invention allows the party to establish a session key for continuing enciphered communication following authentication. The invention does allow two separate secure spaces containing information closed off to the outside world to join using a secure "pipe," thereby forming a temporarily enlarged secure space comprising their union. The invention is useful in the context of secure electric commerce and communication transactions involving the Internet and wireless communications. However, the present invention is not limited to commercial transactions and wireless communications, but may be used in other contexts.

What is claimed is:

1. A method for authenticating two parties and establishing a session key for enciphering communications between said two parties, said method comprising:

generating a first authentication challenge by said first party based on a first exchanged value;

enciphering said first authentication challenge by said first party to obtain a first enciphered authentication challenge;

transmitting said first enciphered authentication challenge from said first party to said second party;

deciphering said first enciphered authentication challenge by said second party and recovering said first exchanged value;

generating a second authentication challenge by said second party based on a second exchanged value;

computing a session key by said second party based on said first and second exchanged values;

re-enciphering said first authentication challenge with said session key by said second party to obtain a first authentication response;

forming a first authentication response message by said second party, said first authentication response message comprising at least said first authentication response and said second authentication challenge;

enciphering said first authentication response message by said second party such that only said first party can decipher said first authentication response message;

transmitting said first authentication response message from said second party to said first party;

deciphering said enciphered authentication response message by said first party to obtain said first authentication response and said second authentication challenge;

determining said second exchange value by said first party;

computing said session key by said first party using said first and second exchanged values; and deciphering said first authentication response by said first party using said session key to authenticate said second party to said first party.

2. The method of claim 1 wherein generating said first authentication challenge by said first party based on a first exchanged value comprises raising a first prime number to a first random power and reducing the result modulo a second prime number to generate said first exchanged value.

3. The method of claim 2 wherein generating said first authentication challenge by said first party based on a first exchanged value comprises generating said first authentication challenge comprising at least said first exchanged value.

4. The method of claim 2 wherein generating said second authentication challenge by said second party based on said second exchanged value comprises raising said first prime number to a second random power and reducing the result modulo said second prime number to generate said second exchanged value.

5. The method of claim 4 wherein generating said second authentication challenge by said second party based on a second exchanged value comprises generating said second authentication challenge comprising at least said second exchanged value.

6. The method of claim 4 wherein computing said session key by said first party based on said first and second exchanged values comprises raising said second exchanged value to said first random power and reducing the result modulo said second prime number, and wherein computing said session key by said second party based on said first and second exchanged values comprises raising said first exchanged value to said second random power and reducing the result modulo said second prime number.

7. The method of claim 1 wherein enciphering said first authentication challenge by said first party to obtain a first enciphered authentication challenge comprises enciphering said first authentication challenge using a public key ciphering algorithm and a public key of said second party.

8. The method of claim 1 wherein enciphering said first authentication response message by said second party comprises enciphering said first authentication response message using a public key ciphering algorithm and a public key of said first party.

9. The method of claim 1 further comprising:
enciphering said second authentication challenge by said first party using said session key to form a second authentication response;
transmitting said second authentication response from said first party to said second party;
deciphering said second authentication response by said second party using said session key to authenticate said first party.

10. The method of claim 9 further comprising enciphering said second authentication response by said first party to obtain an enciphered second authentication response.

11. The method of claim 10 wherein enciphering said second authentication response by said first party to obtain an enciphered second authentication response comprises enciphering said second authentication response using a public key cipher algorithm and a public key of said second party.

12. The method of claim 11 further comprising deciphering by said second party said enciphered second authentication response using said public key.

13. The method of claim 1 wherein computing a session key by said first party and by said second party based on said first and second exchanged values comprises:
computing a first value;
computing a second key value using a symmetric function; and
combining said first and second key values.

14. The method of claim 13 wherein combining said first and second key values comprises adding said first and second key values.

15. A method of establishing a session key used to encipher communications between a first party and a second party, said method comprising:
generating a first exchanged value by said first party;
generating a first message containing said first exchanged value by said first party;
enciphering said first message by said first party;
transmitting said enciphered first message from said first party to said second party;
deciphering said first message by said second party to recover said first exchanged value;
generating a second exchanged value by a second party;

generating a second message containing said second exchanged value by said second party;
enciphering said second message by said second party;
transmitting said enciphered second message from said second party to said first party;
deciphering said enciphered second message by said first party to recover said second exchanged value;
computing a first key value by said first and second parties;
computing a second key value by said first and second parties using a symmetrical function with interchangeable arguments, wherein said first and second exchanged values are used as said arguments to compute said second key value; and
combining said first and second key values by said first and second parties to obtain said session key.

16. The method of claim 15 wherein computing a second key value by said first and second parties comprises computing a product of said first and second exchanged values.

17. The method of claim 16 wherein computing a second key value by said first and second parties further comprises reducing said product modulo a prime number to obtain said second key value.

18. The method of claim 15 wherein computing a second key value by said first and second parties comprises computing the sum of the first exchanged value raised to the power of the second exchanged value and the second exchanged value raised to the power of the first exchanged value reduced modulo a prime number.

19. The method of claim 18 wherein generating a first exchanged value by said first party comprises raising a first prime number to a first random power modulo a second prime number, and wherein generating a second exchanged value by said second party comprises raising said first prime number to a second random power modulo said second prime number.

20. The method of claim 19 wherein computing a first key value by said first and second parties comprises raising said first and second exchanged values respectively to the power of a first prime number and reducing the result modulo a second prime number.

21. The method of claim 20 wherein combining said first and second key values by said first and second parties to obtain said session key comprises adding said first and second key values.

22. A method of establishing a session key used for enciphering communications between a first party and a second party and for authenticating the identities of said first and second parties, said method comprising:
generating a first authentication challenge by said first party based on a first exchanged value;
enciphering said first authentication challenge by said first party to a secret key used by said second party;
transmitting said enciphered first authentication challenge from said first party to said second party;
deciphering said enciphered first authentication challenge by said second party;
determining said first exchanged value by said second party;
generating a second authentication challenge by said second party based on a second exchanged value;
computing said session key by said second party based on said first and second exchanged value;
generating a first authentication response by said second party based on said first authentication challenge, wherein said first authentication response contains one or more unpredictable bits;

transmitting said first authentication response to said first party;

enciphering said second authentication challenge by said second party to a secret key used by said first party;

transmitting said enciphered authentication challenge from said second party to said first party;

receiving said first authentication response and said enciphered second authentication challenge by said first party;

deciphering said enciphered second authentication challenge by said first party using said secret key;

determining said second exchanged value by said first party;

computing said session key by said first party based on said first and second exchanged values; and authenticating said second party by said first party based on said first authentication response.

23. The method of claim 22 wherein generating said first authentication challenge by said first party based on a first exchanged value comprises raising a first prime number to a first random power and reducing the result modulo a second prime number to generate said first exchanged value.

24. The method of claim 23 wherein generating said first authentication challenge by said first party based on a first exchanged value comprises generating a first authentication challenge containing at least said first exchanged value.

25. The method of claim 23 wherein generating said second authentication challenge by said second party based on said second exchanged value comprises raising said first prime number to a second random power and reducing the result modulo said second prime number to generate said second exchanged value.

26. The method of claim 25 wherein generating said second authentication challenge by said second party based on a second exchanged value comprises generating a second authentication challenge containing at least said second exchanged value.

27. The method of claim 25 wherein computing said session key by said first and second parties based on said first and second exchanged values comprises raising said second and first exchanged values to said first and second random powers respectively and reducing the result modulo said second prime number.

28. The method of claim 22 wherein enciphering said first authentication challenge by said first party to a secret key used by said second party comprises enciphering said first authentication challenge using a public key ciphering algorithm and a public key of said second party.

29. The method of claim 22 wherein enciphering said second authentication challenge by said second party to a secret key used by said first party comprises enciphering said second authentication challenge using a public key ciphering algorithm and a public key of said first party.

30. The method of claim 22 further comprising generating a second authentication response by said first party based on said second authentication challenge;

transmitting said second authentication response from said first party to said second party;

receiving said second authentication response by said second party; and authenticating said first party by said second party based on said second authentication response.

31. The method of claim 30 wherein transmitting said second authentication response from said first party to said second party comprises enciphering said second authentication response by said first party to obtain an enciphered second authentication response and wherein receiving said second authentication response by said second party comprises deciphering the enciphered second authentication response by said second party.

32. The method of claim 30 wherein authenticating said first party by said second party based on said second authentication response comprises:

computing an expected authentication response by said second party; and comparing said second authentication response with said expected authentication response to authenticate said first party.

33. The method of claim 22 wherein generating a first authentication response by said second party based on said first authentication challenge comprises enciphering said first authentication challenge to obtain said first authentication response.

34. The method of claim 22 wherein generating a first authentication response by said second party based on said first authentication challenge comprises combining bits of said first authentication challenge with unexpected bits.

35. The method of claim 34 wherein combining bits of said first authentication challenge with unexpected bits comprises combining bits of said first authentication challenge with bits of said second authentication challenge.

36. The method of claim 35 wherein combining bits of said first authentication challenge with unexpected bits comprises combining said first authentication challenge with said session key.

37. The method of claim 36 wherein combining said first authentication challenge with said session key further comprises generating a hash code based on a combination of said first authentication challenge and said session key.

38. The method of claim 37 wherein authenticating said second party by said first party based on said first authentication response comprises hashing a combination of said first authentication challenge and said second key to obtain an expected authentication response and comparing said expected authentication response with said first authentication response received from said second party.

39. A cryptographic communication apparatus used by a first party to communicate with a second party, said apparatus comprising:

a communications interface for communicating with said second party over a communication channel;

a processor coupled to said communication interface to perform cryptographic calculations, said processor programmed to:

generate a first authentication challenge based on a first exchanged value;

encipher said first authentication challenge to a key used by said second party;

compute a session key based on said first exchanged value and a second exchanged value received from said second party; and verify the identity of said second party based on a first authentication response received from said second party.

40. An apparatus of claim 39 wherein said processor is further programmed to compute a second authentication response based on a second authentication challenge received from said second party and said session key.

41. The apparatus of claim 40 wherein said processor is further programmed to encipher said second authentication response to a key used by said second party.

42. The apparatus of claim 41 wherein computing a second authentication response by said processor comprises enciphering said second authentication challenge with said session key.

43. The apparatus of claim 41 wherein computing a second authentication response by said processor comprises combining bits of said second authentication challenge with one or more bits unknown to said second party.

44. The apparatus of claim 43 wherein combining bits of said second authentication challenge with bits unknown to said second party comprises combining said second authentication response with said session key.

45. The apparatus of claim 44 wherein combining said authentication challenge with said session key further comprises generating a hash code based on a combination of said second authentication challenge and said session key.

46. A cryptographic communication system used for communications between first and second parties, said communication system comprising:
a first communication terminal connected to a communications channel, said first communications terminal comprising a processor programmed to:
generate a first authentication challenge containing at least a first exchanged value;
encipher said first authentication challenge to a key used by said second party;
decipher a second authentication challenge received from said second party to obtain a second exchanged value;
compute a session key based on said first exchanged value and said second exchanged value;
verify the identity of said second party based on a first authentication response received from said second party; and
compute a second authentication response based on said second authentication challenge;
a second communications terminal connected to said communications channel, said second communications terminal comprising a processor programmed to:
generate said second authentication challenge containing at least said second exchanged value;
decipher said first authentication challenge received from said first party to obtain said first exchanged value;
compute a first authentication response based on said first authentication challenge;
encipher said second authentication challenge to a key used by said first party;
compute a session key based on said first exchanged value and said second exchanged value; and
verify the identity of said first party based on a second authentication response received from said first party.

47. The system of claim 46 wherein said first authentication response is computed by said processor in said second communication terminal by enciphering said first authentication challenge with said session key.

48. The system of claim 46 wherein said second authentication response is computed by said processor in said first communication terminal by enciphering said second authentication challenge with said session key.

49. The system of claim 46 wherein said first authentication response is computed by said processor in said second communication terminal by combining bits of said first authentication challenge with one or more bits unknown to said first party.

50. The system of claim 49 wherein combining bits of said first authentication challenge with bits unknown to said first party comprises combining said first authentication challenge with said session key.

51. The system of claim 49 wherein combining said first authentication challenge with said session key further comprises generating a hash code based on a combination of said second authentication challenge and said session key.

52. The system of claim 46 wherein said second authentication response is computed by said processor in said first communication terminal by combining bits of said second authentication challenge with one or more bits unknown to said second party.

53. The system of claim 52 wherein combining bits of said second authentication challenge with bits unknown to said second party comprises combining said second authentication challenge with said session key.

54. The system of claim 53 wherein combining said second authentication challenge with said session key further comprises generating a hash code based on a combination of said second authentication challenge and said session key.

* * * * *